US008613521B2

(12) United States Patent
Murata et al.

(10) Patent No.: US 8,613,521 B2
(45) Date of Patent: Dec. 24, 2013

(54) HAND ILLUMINATING APPARATUS

(75) Inventors: Yoshiyuki Murata, Saitama (JP); Hideo Takenawa, Hachioji (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 13/615,385

(22) Filed: Sep. 13, 2012

(65) Prior Publication Data

US 2013/0083508 A1 Apr. 4, 2013

(30) Foreign Application Priority Data

Sep. 30, 2011 (JP) ................................ 2011-216627

(51) Int. Cl.
*G01D 11/28* (2006.01)

(52) U.S. Cl.
USPC .................................... 362/23.16; 362/23.01

(58) Field of Classification Search
USPC .......... 362/23.01, 23.07, 23.09, 23.16, 23.21, 362/489
See application file for complete search history.

(56) References Cited

U.S. PATENT DOCUMENTS 5,531,181 A * 7/1996 Cookingham .................. 362/26
6,004,001 A * 12/1999 Noll ............................... 362/30
6,017,127 A * 1/2000 Kurple ............................ 362/29
6,302,552 B1 * 10/2001 Ross et al. ...................... 362/30
6,598,988 B1 * 7/2003 Noll et al. ....................... 362/26
2002/0001185 A1 * 1/2002 Wilhelm et al. ................ 362/30
2013/0094175 A1 * 4/2013 Shimane et al. ........... 362/23.19

FOREIGN PATENT DOCUMENTS

JP 2006-300787 A 11/2006

* cited by examiner

*Primary Examiner* — David V Bruce
(74) *Attorney, Agent, or Firm* — Holtz, Holtz, Goodman & Chick, PC

(57) ABSTRACT

A hand illuminating apparatus is described. According to one implementation of the present invention, the hand illuminating apparatus includes a hand which is driven to rotate by a hand spindle. A light source is provided in a position below the hand spindle. A first optical guiding section is provided to guide light from the light source from a lower edge to an upper edge of the hand spindle. A second optical guiding section, in which a plurality of optical waveguides are formed on the hand, is provided to guide light which exits from the first optical guiding section from a base to a tip of the hand.

5 Claims, 13 Drawing Sheets

1
2
3
4
5
5a
5b
6
7
8
9
10
11
12
13
14
15
15a
16
17
30
100

200
203
18a
204
6
206
5a
5
12
3
9
13
208
204
205
11
2
1
17
5b
8

300
203
204
6
5a
5
12
301
1
2
5b
8
11
9
3
205
204
208
13

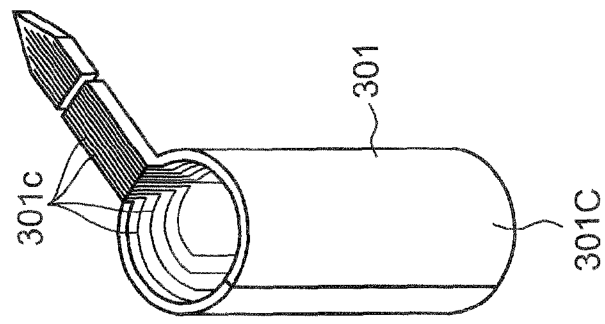
FIG. 10D
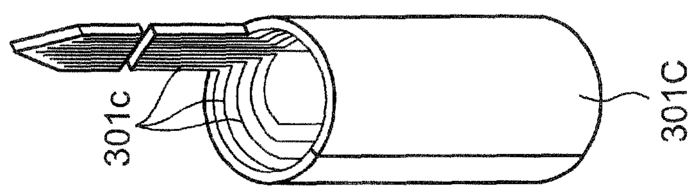
FIG. 10C
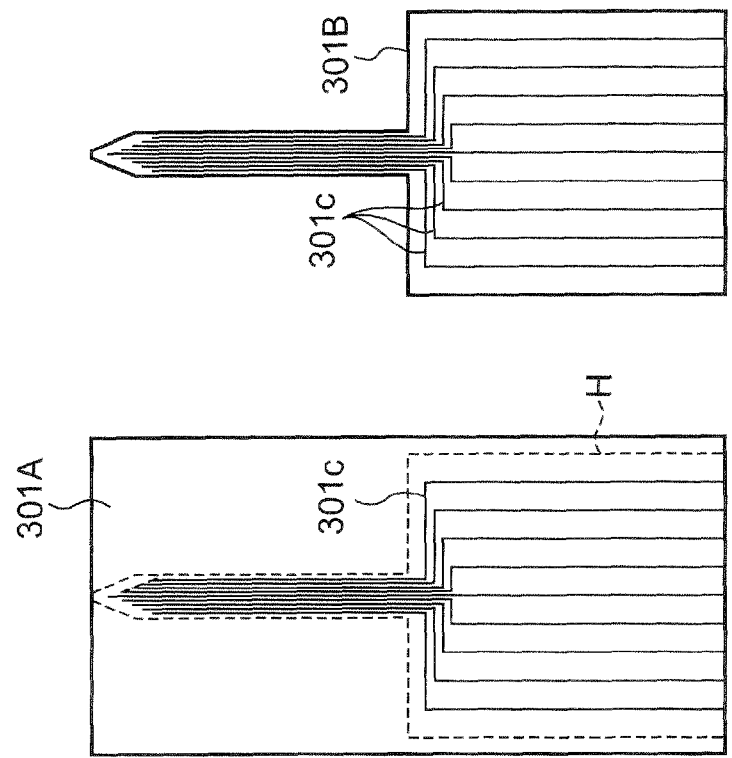
FIG. 10B
FIG. 10A 400
203
204
6
401
5a
5
12
1
17
2
5b
11
13
402a
9
205
3
204

500
203
204
6
501
5a
5
12
9
205
3
204
502
503a
13
504a
13A
2
17A
17
1
5b

HAND ILLUMINATING APPARATUS

BACKGROUND OF THE INVENTION

1. Field of the Invention

The present invention relates to a hand illuminating apparatus. Specifically, the present invention relates to a hand illuminating apparatus which can efficiently illuminate a hand section.

2. Description of the Related Art

Japanese Patent Application Laid-Open Publication No. 2006-300787 describes a clock with hands where the hands such as an hour hand, minute hand, etc. are illuminated. According to the hand type clock disclosed in Japanese Patent Application Laid-Open Publication No. 2006-300787, the hand is formed from an optical guiding member such as acrylic resin, polycarbonate resin and the like.

However, when the hand itself is configured from an optical guiding member, the material of the hand is limited. Therefore, there is a problem that the design is restricted. Also, when the hand itself is an optical guiding member, the entire hand is illuminated, therefore, it is difficult to illuminate only a portion of the hand. In this case, it is possible to consider coloring the hand so that light is blocked in portions other than the portion to be illuminated in the hand. However, such process of coloring is troublesome.

It is also possible to consider attaching the optical guiding member to the rear side of the hand and to illuminate only one portion of the hand. However, since the optical guiding member is relatively heavy, the rotating torque becomes large.

Japanese Patent Application Laid-Open Publication No. 2006-300787 discloses embedding a light emitting diode in the hand spindle. However, although this may be possible in a wall clock in which the hand spindle has a large diameter, since the hand spindle of a watch has a small diameter, it is difficult to embed a light emitting diode.

SUMMARY OF THE INVENTION

The present invention has been made in consideration of the above situation, and one of the main objects is to provide a hand illuminating apparatus which can easily and efficiently illuminate a desired position of a hand.

In order to achieve any one of the above advantages, according to an aspect of the present invention, there is provided a hand illuminating apparatus including:

a hand which is driven to rotate by a hand spindle;

a light source provided in a position below the hand spindle;

a first optical guiding section which is provided to guide light from the light source from a lower edge to an upper edge of the hand spindle; and a second optical guiding section in which a plurality of optical waveguides are formed on the hand, and which is provided to guide light which exits from the first optical guiding section from a base to a tip of the hand.

According to an aspect of the present invention, there is provided a hand illuminating apparatus including:

a hand which is driven to rotate by a hand spindle;

a light source provided in a position below the hand spindle; and an integrated optical guiding section in which a plurality of optical waveguides are formed on the hand spindle and the hand, and which guides light from the light source from a lower edge to an upper edge of the hand spindle and from a base to a tip of the hand.

BRIEF DESCRIPTION OF THE DRAWINGS

The present invention and the above-described objects, features and advantages thereof will become more fully understood from the following detailed description with the accompanying drawings and wherein;

FIG. 2A is a cross sectional view showing a base material sheet and an under clad layer;

FIG. 2B is a cross sectional view showing a state in which an optical waveguide pattern is formed on an under clad layer;

FIG. 2C is a cross sectional view showing a completed optical guiding sheet;

FIG. 10A to FIG. 10D are diagrams showing a manufacturing method of an optical guiding sheet used in the hand type watch shown in FIG. 9;

FIG. 10A is a planar view showing the optical guiding sheet in a band shape;

FIG. 10B is a planar view showing the optical guiding sheet in a projecting shape made by cutting the optical guiding sheet in a band shape;

FIG. 10C is a perspective view showing the optical guiding sheet in a pail shape in a state where the bottom half of the optical guiding sheet in a projecting shape is rolled;

FIG. 10D is a perspective view showing a completed optical guiding sheet;

DETAILED DESCRIPTION OF THE PREFERRED EMBODIMENT

First Embodiment

Figure 1:
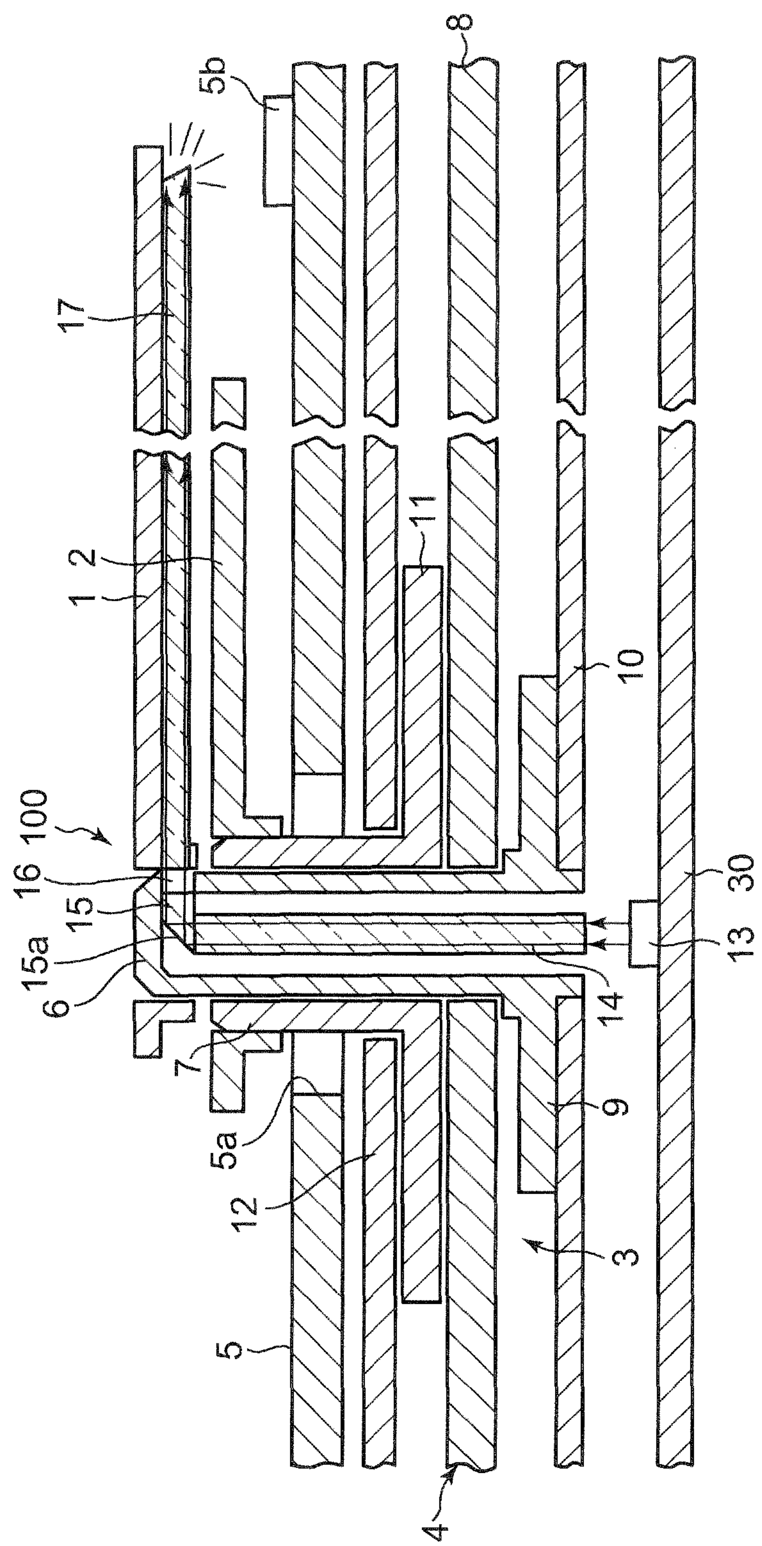
FIG. 1 is a cross sectional view showing a main section of a hand type watch of a first embodiment of the present invention.

FIG. 1 is a side sectional view of a hand type watch of a first embodiment.

The hand type watch 100 includes a watch movement 3 including a mechanism for moving a plurality of hands (minute hand 1 and hour hand 2) and housing 4 for storing the watch movement 3.

A dial plate 5 is provided on an upper surface side of the housing 4. A through hole 5*a* is provided in a center section of the dial plate 5.

A minute hand spindle 6 and an hour hand spindle 7 which stores the minute hand spindle 6 are inserted through the through hole 5*a* from the lower side and the upper portions of the minute hand spindle 6 and the hour hand spindle 7 protrude from the dial plate 5.

The minute hand 1 is provided on the upper edge of the minute hand spindle 6 and the hour hand 2 is provided on the upper edge of the hour hand spindle 7.

A center wheel 9 is provided on the lower edge of the minute hand spindle 6.

In other words, the lower edge of the minute hand spindle 6 extends to the bottom of a main plate 8 of the housing 4.

The center wheel 9 is provided between the main plate 8 and a train wheel bridge 10 provided below the main plate 8.

An hour wheel 11 is provided on the lower edge of the hour hand spindle 7.

An hour wheel 11 is provided between the main plate 8 and an hour wheel friction 12 above the main plate 8.

A circuit substrate 30 is provided below the train wheel bridge 10.

Various electronic components are provided on the upper surface of the circuit substrate 30. Specifically, in the position directly below the minute hand spindle 6, a light emitting diode (LED) 13 is provided as a light source.

Next, the minute hand spindle 6 and the minute hand 1 are described in detail.

The minute hand spindle 6 is a hollow axis.

The center portion of the minute hand spindle 6 is provided with an optical guiding block 14 which composes a portion of a first optical guiding member in a column shape formed from, for example, acrylic resin, polycarbonate resin, or the like.

The optical guiding block 14 is provided fixed to the minute hand spindle 6 to rotate together with the minute hand spindle 6.

The optical guiding block 14 extends from the lower edge of the minute hand spindle 6 to near the upper edge.

The optical guiding block 14 guides the light from the light emitting diode 13 from the lower edge through the optical guiding block 14 and guides the light to near the upper edge of the minute hand spindle 6.

An optical guiding block 15 which composes the other portion of the first optical guiding member and which includes a reflecting surface 15*a* is provided in the upper edge of the hollow portion of the minute hand spindle 6, and the optical guiding block 15 is formed from, for example, acrylic resin, polycarbonate resin, or the like.

The optical guiding block 15 is connected to the upper edge of the optical guiding block 14 and reflects the light guided to the upper edge of the minute hand spindle 6 to the tip of the minute hand 1 with the reflecting surface 15*a*.

A window 16 so that the light reflected by the optical guiding block 15 exits to the outside of the minute hand spindle 6 is formed on the upper edge of the minute hand spindle 6.

An optical guiding sheet 17 which composes the second optical guiding member is attached to the lower surface of the minute hand 1.

Figure 2A:
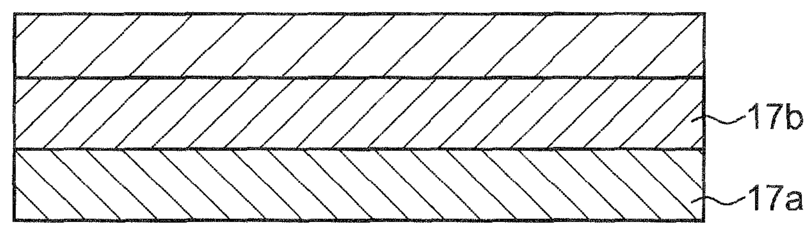
FIG. 2A to FIG. 2C are diagrams showing a manufacturing method of an optical guiding sheet used in the hand type watch shown in FIG. 1.
Figure 2B:
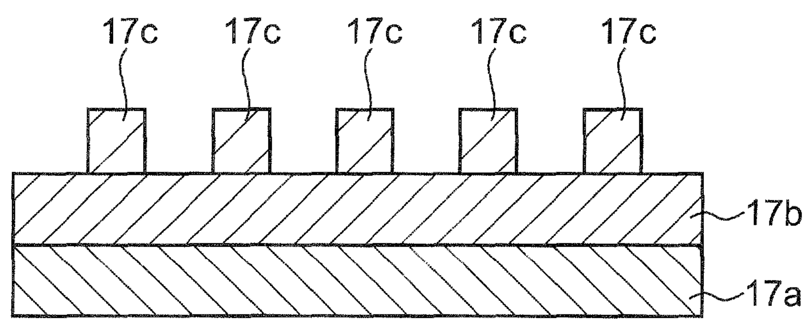
Figure 2C:
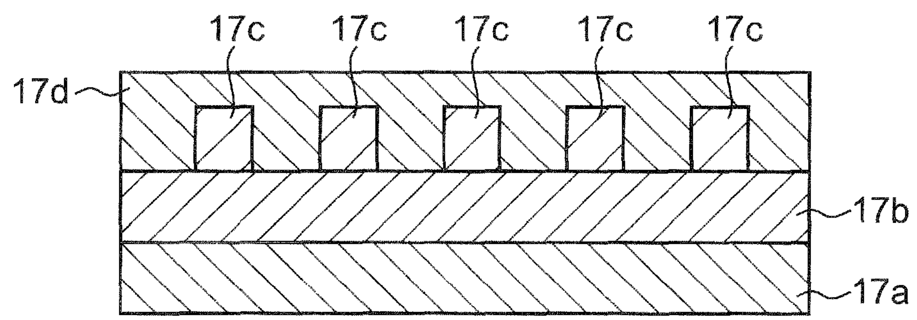

For example, the optical guiding sheet 17 is formed by, applying a core material on an under clad layer 17*b* formed on a base material sheet 17*a* as shown in FIG. 2A, forming a pattern of an optical waveguide (core) 17*c* by irradiating ultraviolet rays through a photomask as shown in FIG. 2B, and applying an over clad layer 17*d* on the above as shown in FIG. 2C.

The under clad layer 17*b* can be formed directly on the minute hand 1 without using the base material sheet 17*a*.

An entrance 18*a* of the optical guiding sheet 17 is positioned near the optical guiding block 15 and, an exit 18*b* of the optical guiding sheet 17 is positioned at the tip of the minute hand 1.

Figure 3:
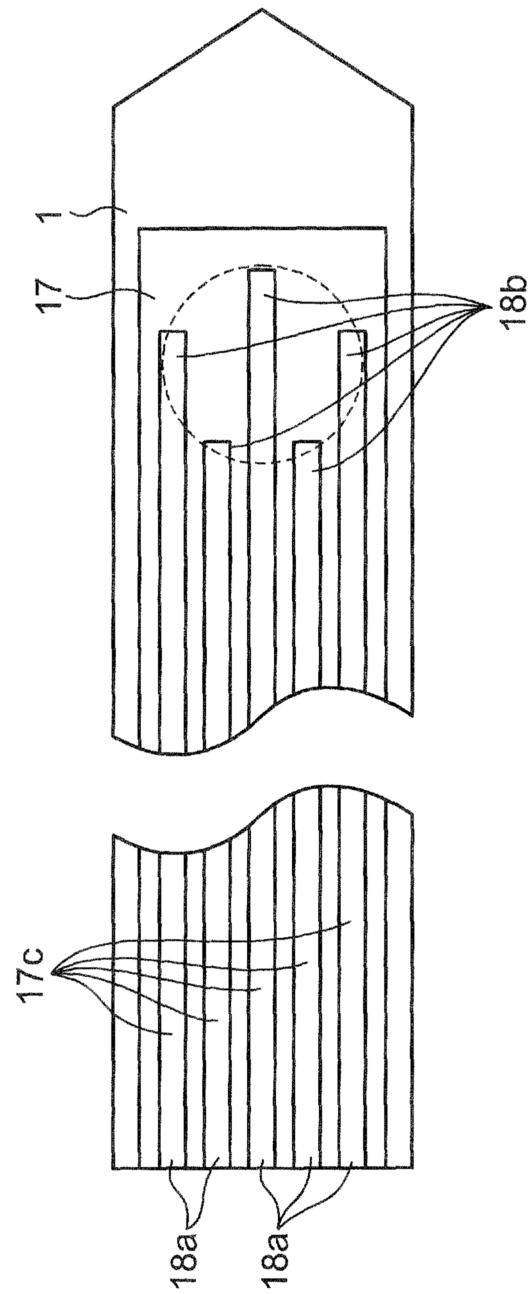
FIG. 3 is a lower face view showing a minute hand formed with an optical guiding sheet in the hand type watch shown in FIG. 1.

As shown in FIG. 3, the optical waveguide 17*c* extends along the longitudinal direction of the minute hand 1.

In this case, for example, the exits 18*b* of the plurality of optical waveguides 17*c* are provided so that light exits in a round shape as shown with broken lines in FIG. 3.

The exits 18*b* of the plurality of optical waveguides 17*c* include an inclined surface 18*c* (see FIG. 1) so that light exits to the dial plate 5 side.

According to the hand type watch 100 configured as described above, the light of the light emitting diode 13 is guided to near the upper edge of the minute hand spindle 6 through the optical guiding block 14 and the light is further guided through the optical guiding block 15 to the optical guiding sheet 17 to reach the tip of the minute hand 1 and light exits from the tip.

With this, the tip portion of the minute hand 1 is illuminated.

As a result, numerals 5*b*, etc. provided on the dial plate 5 are illuminated.

According to the hand type watch 100, the following effects can be achieved.

The optical guide blocks 14 and 15 are provided inside the minute hand spindle 6 and the light emitting diode 13 which is the light source can be provided on the substrate below the minute hand spindle 6.

The transmission of light from the base edge of the minute hand 1 to the tip is performed by the optical guiding sheet 17. Therefore, the degree of freedom of selecting material of the minute hand 1 increases and the optical waveguide 17*c* in the optical guiding sheet 17 can be drawn freely. Therefore, the tip of the minute hand 1 can be illuminated efficiently.

As a result, the state of movement of the minute hand 1 can be reliably and easily confirmed by sight.

The light from the light emitting diode 13 is guided to the tip of the minute hand 1 through the optical guiding blocks 14 and 15 and the optical guiding sheet 18, and therefore, efficient optical transmission can be performed.

The optical guiding sheet 17 is relatively light, and therefore the movement of the minute hand 1 itself can be performed smoothly.

Second Embodiment

Figure 4:
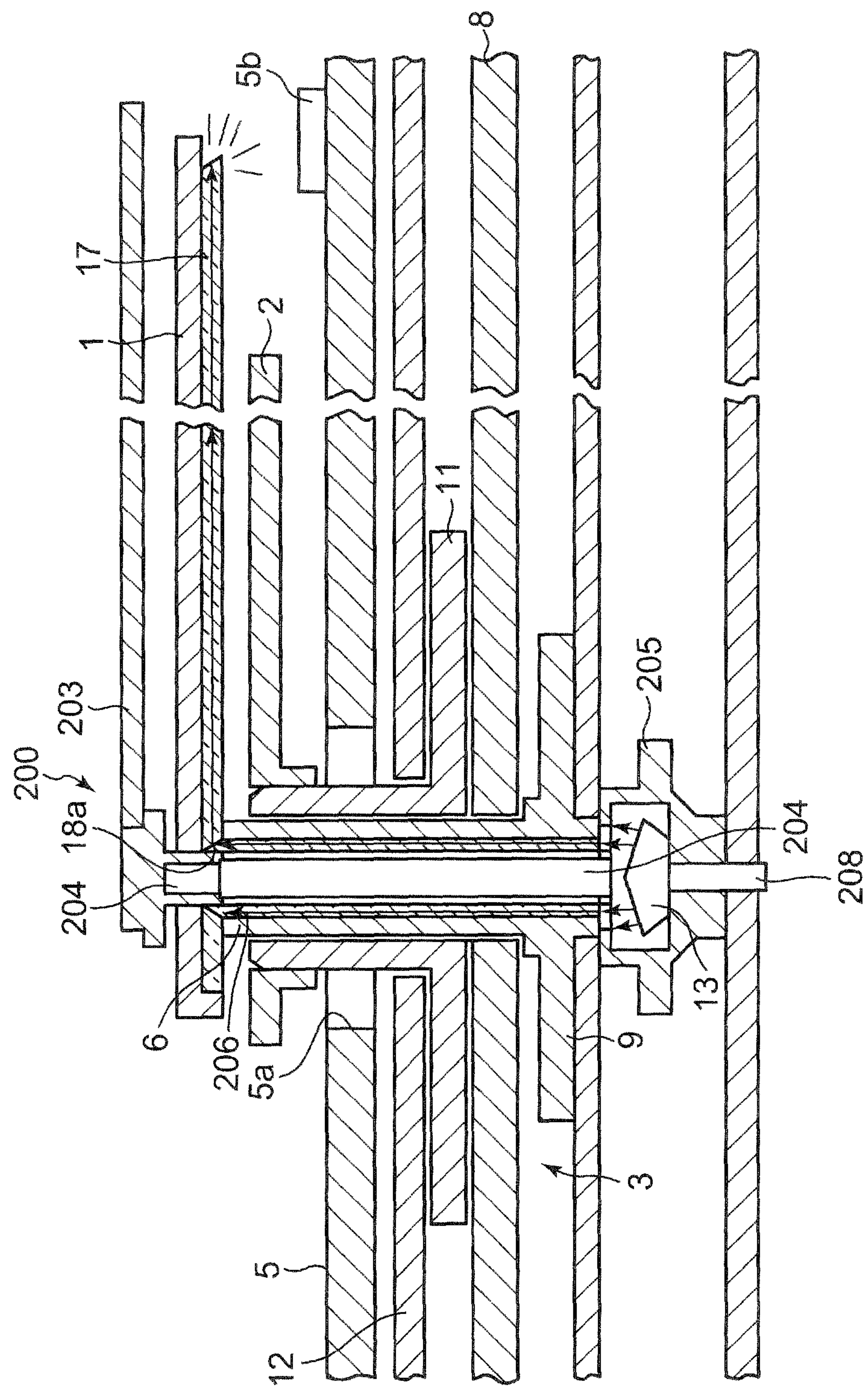
FIG. 4 is a cross sectional view showing a main section of a hand type watch of a second embodiment of the present invention.

FIG. 4 shows a second embodiment of a hand type watch of the present invention.

In the drawings, the same reference numerals are applied to the members which are the same as those of the first embodiment.

The hand type watch 200 includes a second hand 203 other than the minute hand 1 and the hour hand 2.

The second hand 203 is attached to the upper edge of a second hand spindle 204 which passes through the hand spindle 6 vertically.

The lower edge of the second hand spindle 204 is fixed in a fit state to the center portion of a second wheel 205.

A hollow portion is formed inside the second wheel 205 and a light emitting diode (LED) 13 which is a light source is provided in the hollow portion.

The light emitting diode 13 is supported by a cylinder shaped supporting body 208.

The supporting body 208 is fixed to, for example the circuit substrate 30 so as not to rotate together with the second wheel 205.

The supply of power source to the light emitting diode 13 is performed by a line (not shown) stored in the supporting body 206.

Figure 5:
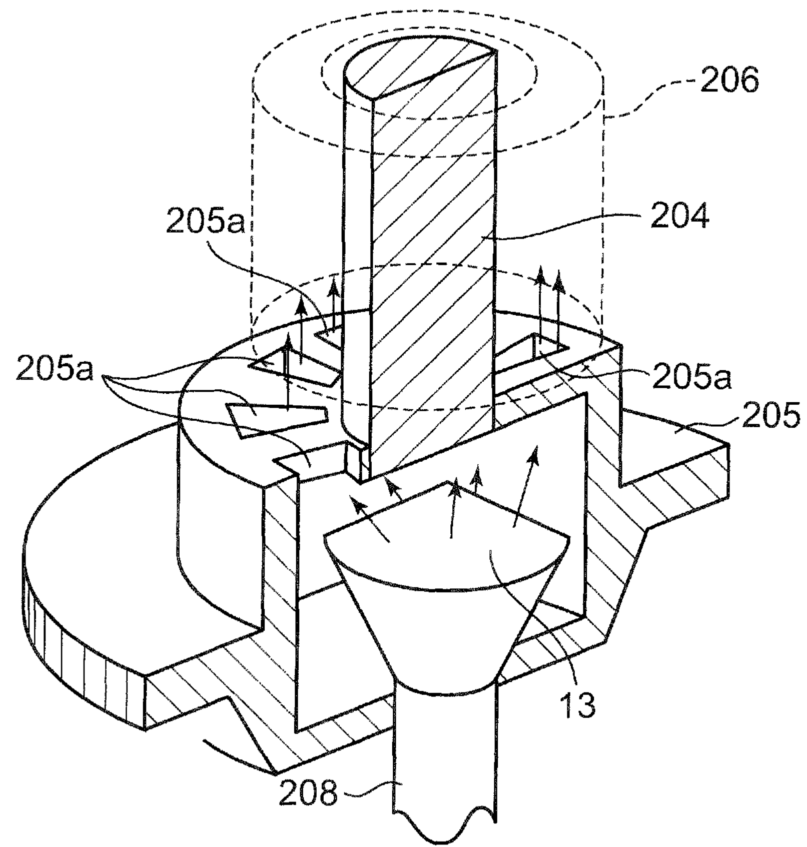
FIG. 5 is a cross sectional view showing a center wheel of the hand type watch shown in FIG. 4 viewed diagonally above.

As shown in FIG. 5, slits 205*a* are formed radially on the upper edge surface of the second wheel 205.

The light from the light emitting diode 13 is emitted upward through the slits 205*a*.

Instead of the optical guiding block 14 of the first embodiment, an optical guiding sheet 206 which composes the first optical guiding member is attached to the minute hand spindle 6.

Figure 7:
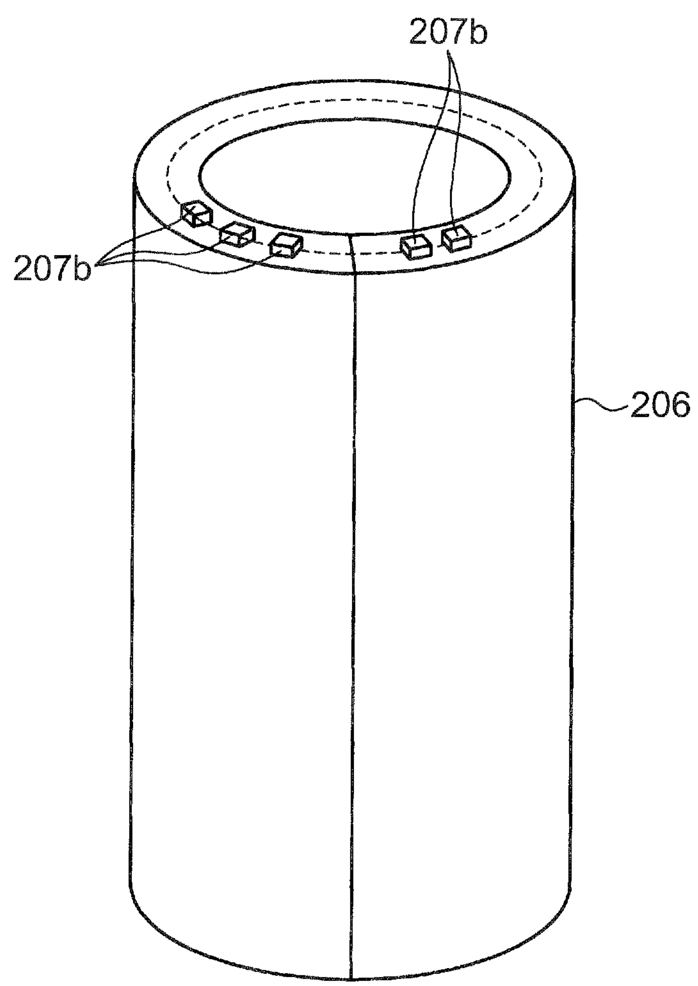
FIG. 7 is a perspective view showing a cylinder shaped optical guiding sheet of the hand type watch shown in FIG. 4.

As shown in FIG. 7, other than the point that the shape is a cylinder shape, the optical guiding sheet 206 is made with a substantially same configuration as the optical guiding sheet 17.

The optical guiding sheet 206 is bonded in a fitted state to the inside of the minute hand spindle 6.

Figure 6:
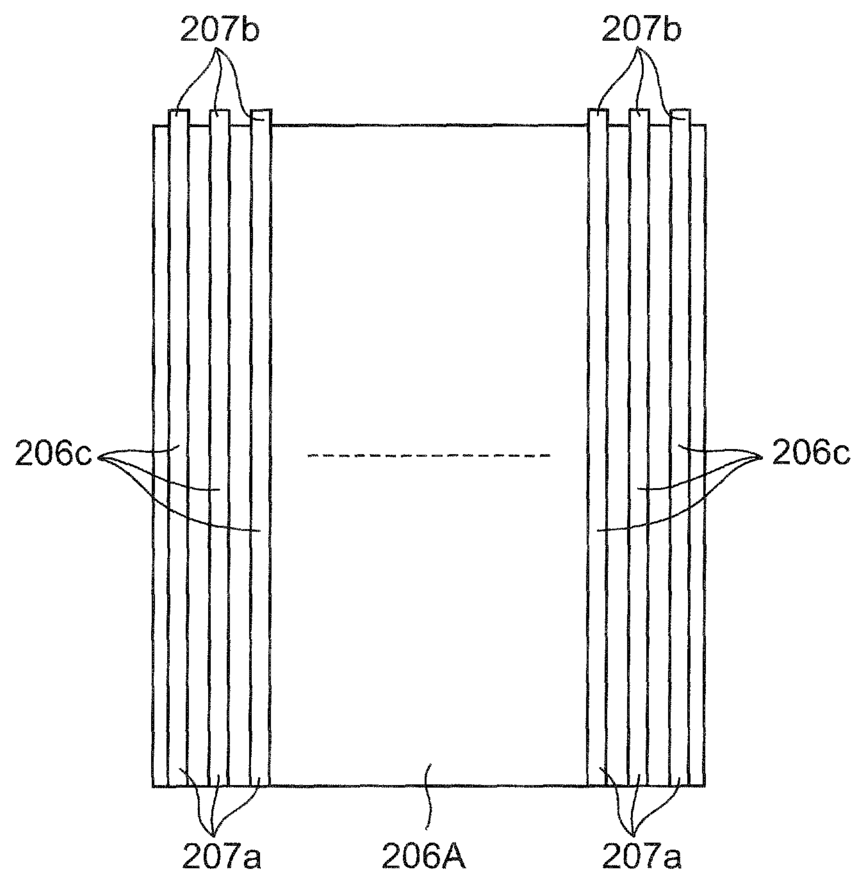
FIG. 6 is a diagram showing a state of an expanded cylinder shaped optical guiding sheet of the hand type watch shown in FIG. 4.

The optical guiding sheet 206 is the optical guiding sheet 206A in a band shape shown in FIG. 6 rolled to a cylinder shape shown in FIG. 7.

Here, the short side of the optical guiding sheet 206A is a dimension substantially the same as the dimension of the length of the inner circumference of the minute hand spindle 6 and the long side of the optical guiding sheet 206A is a dimension substantially the same as the dimension of the length of the minute hand spindle 6.

Optical waveguides 206*c* are provided aligned in a predetermined pitch in a direction parallel to the short side of the optical guiding sheet 206A.

The optical waveguides 206*c* extend in a direction parallel to the long side of the optical guiding sheet 206A.

Both long sides of the optical guiding sheet 206A are bonded matched to each other to form a cylinder shaped optical guiding sheet 206 as shown in FIG. 7.

As shown in FIG. 7, exits 207*b* of the plurality of optical waveguides 206*c* are exposed in a predetermined interval in a circumferential direction of the optical guiding sheet 206 from the upper edge of the optical guiding sheet 206 as formed above.

The exits 207*b* are positioned at an even interval in the circumferential direction of the optical guiding sheet 206.

FIG. 7 shows only five exits 207*b* and the other exits are omitted.

Figure 8:
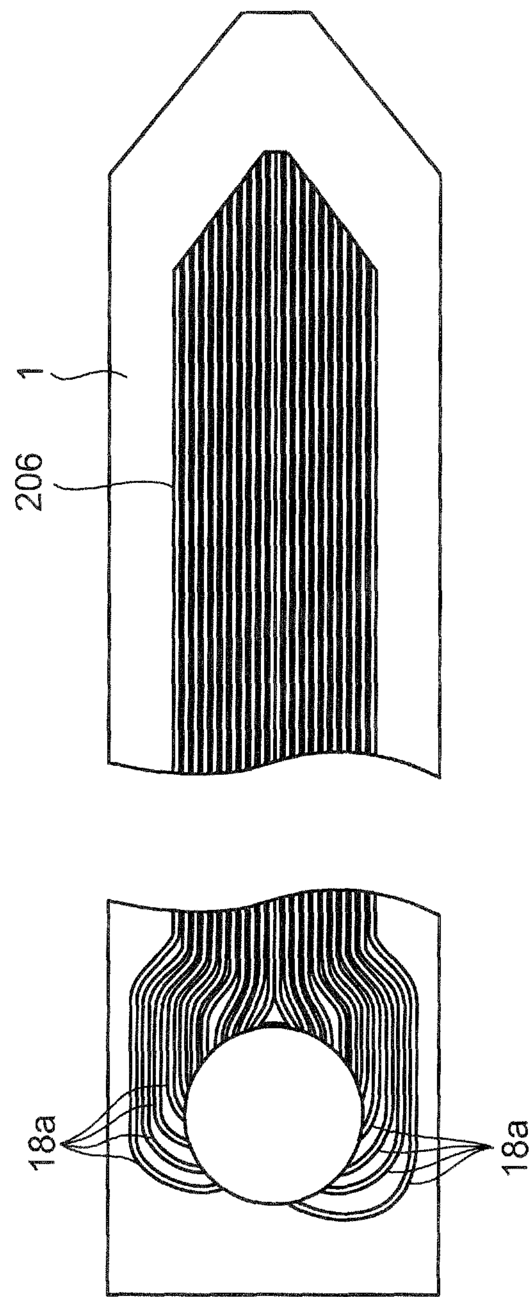
FIG. 8 is a lower face view showing a minute hand formed with an optical guiding sheet in the hand type watch shown in FIG. 4.

As shown in FIG. 8, the optical waveguides 17*c* of the optical waveguide sheet 17 attached to the lower surface of the minute hand 1 are provided in a predetermined interval in the circumferential direction of the minute hand spindle 6 so that entrances 18*a* are in contact one by one with the exits 207*b* of the optical guiding sheet 206.

According to the hand type watch 200 as configured above, the light of the light emitting diode 13 is guided to the optical guiding sheet 206 through the slits 205*a* and is further guided to near the upper edge of the minute hand spindle 6 through the optical guiding sheet 206.

The light of the light emitting diode 13 reaches the tip of the minute hand 1 through the optical guiding sheet 17 and exits from the tip.

With this, the tip portion of the minute hand 1 is illuminated.

As a result, the numerals 5*b*, etc. provided on the dial plate 5 are illuminated.

According to the hand type watch 200 of the second embodiment, the following effects can be achieved.

In other words, the optical guiding sheet 206 is provided along the inner circumference of the minute hand spindle 6 and the space of the center portion of the minute hand spindle 6 is formed. Therefore, another spindle, here the second hand spindle 204, can be passed through.

Third Embodiment

Figure 9:
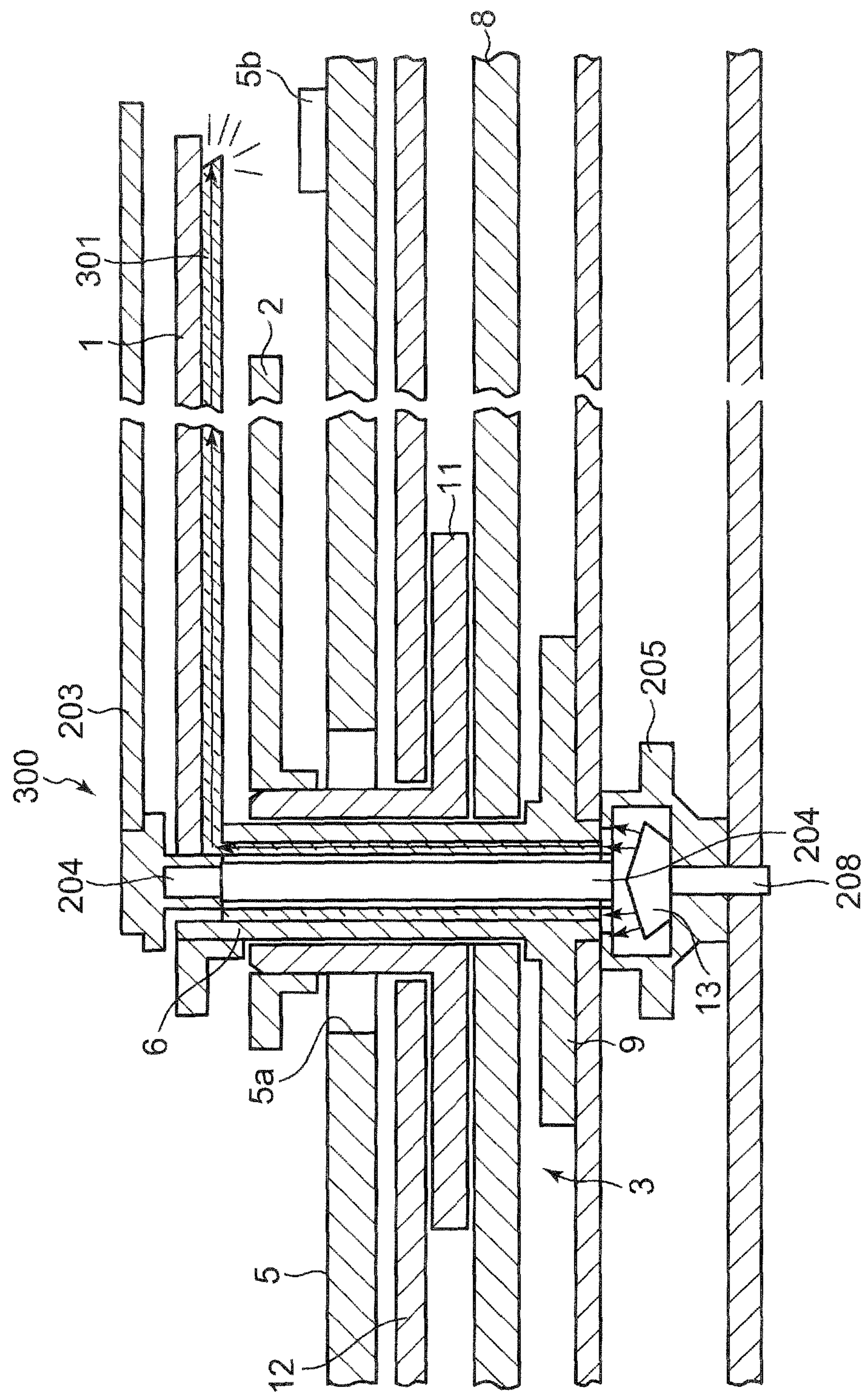
FIG. 9 is a cross sectional view showing a main section of a hand type watch of a third embodiment of the present invention.

FIG. 9 shows a third embodiment of a hand type watch of the present invention.

In the drawings, the same reference numerals are applied to the members which are the same as those of the above embodiments.

The hand type watch 300 of the third embodiment includes an integrated optical guiding sheet 301 which includes the optical guiding sheet 206 which composes the first optical guiding member and the optical guiding sheet 17 which composes the second optical guiding member of the hand type watch 200 of the second embodiment.

The integrated optical guiding sheet 301 is made as shown in FIG. 10.

First, a band shaped base material sheet is prepared. Here, the dimension of the short side of the base material sheet is substantially the same dimension as the length of the inner circumference of the minute hand spindle 6 and the dimension of the long side is about the dimension of the length of the minute hand spindle 6 and the dimension of the length of the minute hand 1 added together.

Similar to a method of the first embodiment, an under clad layer (not shown), a plurality of optical waveguides 301*c* and an over clad layer (not shown) are formed on the base material sheet in order to make a band shaped optical guiding sheet 301A (FIG. 10A).

In this case, the optical waveguides 301*c* are bent from a partial portion so that the pitch of alignment is large in the bottom half portion of the optical guiding sheet 301A and small in the upper half portion of the optical guiding sheet 301A.

Next, as shown in FIG. 10B, the optical guiding sheet 301A is cut in a projected shape.

Specifically, the region where the optical waveguides 301*c* are not formed shown in FIG. 10A, in other words, the upper right portion and the upper left portion are cut along the broken line H to be removed and the optical guiding sheet 301B with a projected shape is made.

Next, as shown in FIG. 100, both edges of the bottom half portion of the optical guiding sheet 301B are matched to each other and rolled in a cylinder shape to make an optical guiding sheet 301C in a pail shape.

Then, as shown in FIG. 10D, the upper half portion is folded to the outside and the integrated optical guiding sheet 301 of the third embodiment is made.

Next, the method of attaching the integrated optical guiding sheet (optical guiding member) 301 is described.

First, the folded portion of the optical guiding sheet 301 is attached to the lower surface of the minute hand 1.

Next, the cylinder shaped portion of the optical guiding sheet 301 is inserted inside the minute hand spindle 6 from the upper side of the minute hand spindle 6.

Then, the minute hand 1 is attached to the upper edge of the minute hand spindle 6.

The folded portion of the optical guiding sheet 301 can be attached to the lower surface of the minute hand 1 after the cylinder shaped portion of the optical guiding sheet 301 is inserted inside the minute hand spindle 6 from above and the minute hand 1 is attached to the upper edge of the minute hand spindle 6.

According to the hand type watch 300 as configured above, the light of the light emitting diode 13 is guided to the tip of the minute hand 1 through the optical guiding sheet 301 and exits from the tip.

With this, the numerals 5*b*, etc. provided on the dial plate 5 are illuminated.

According to the hand type watch 300 of the third embodiment, light is transmitted by one integrated optical guiding sheet 301. Therefore, the transmission loss of light becomes small.

Since only one optical guiding sheet 301 is used, the manufacturing and management is easy.

Fourth Embodiment

Figure 11:
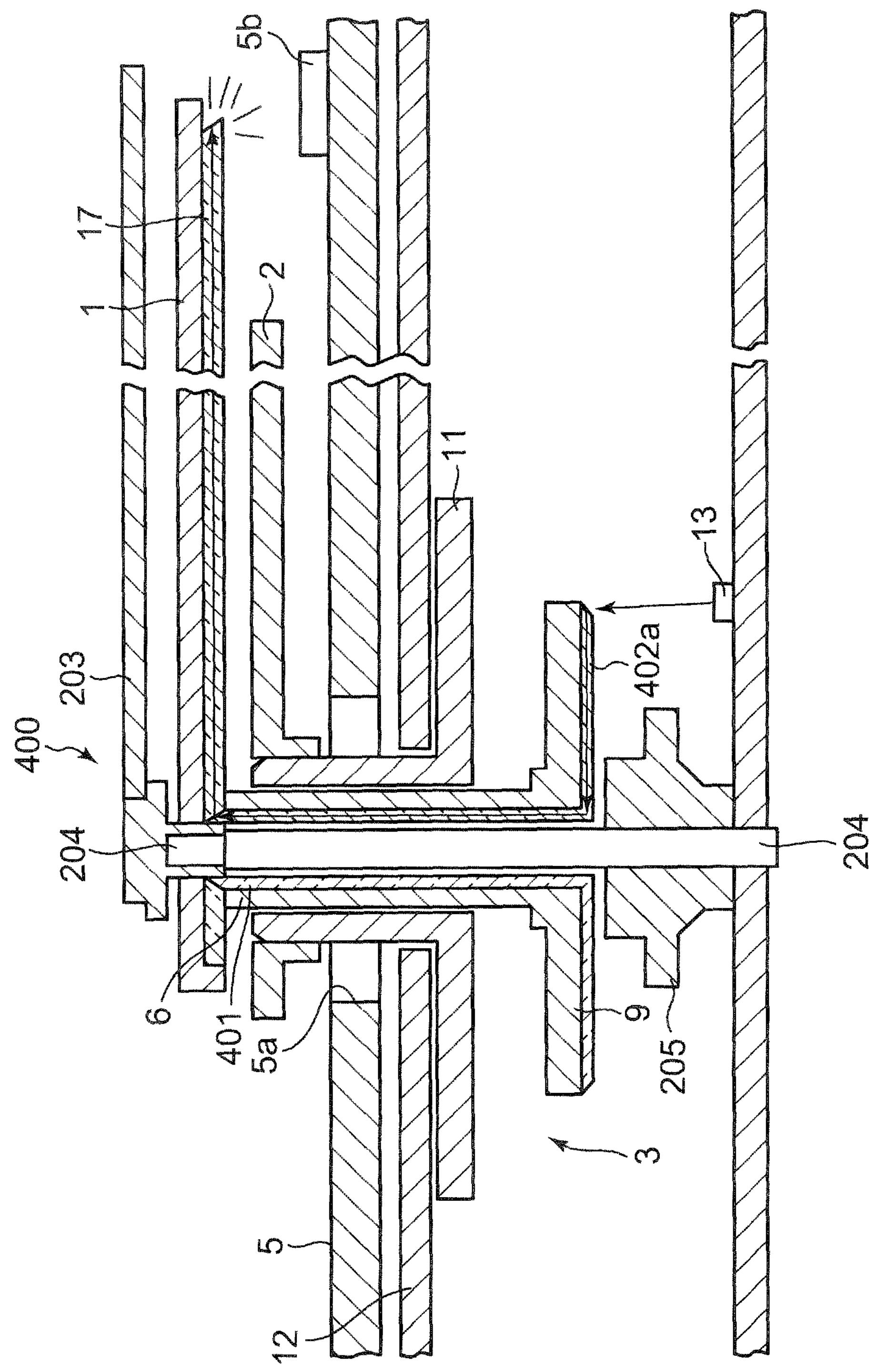
FIG. 11 is a cross sectional view showing a main section of a hand type watch of a fourth embodiment of the present invention.

FIG. 11 shows a fourth embodiment of the hand type watch of the present invention.

In the drawings, the same reference numerals are applied to the members which are the same as those of the above embodiments.

The hand type watch 400 of the fourth embodiment includes a different configuration from the entrance 207*a* of the optical guiding sheet 206 of the hand type watch 200 of the second embodiment.

In other words, in the hand type watch 200 of the second embodiment, the entrance 207*a* is provided on the lower edge of the optical guiding sheet 206 in a cylinder shape.

Figure 12:
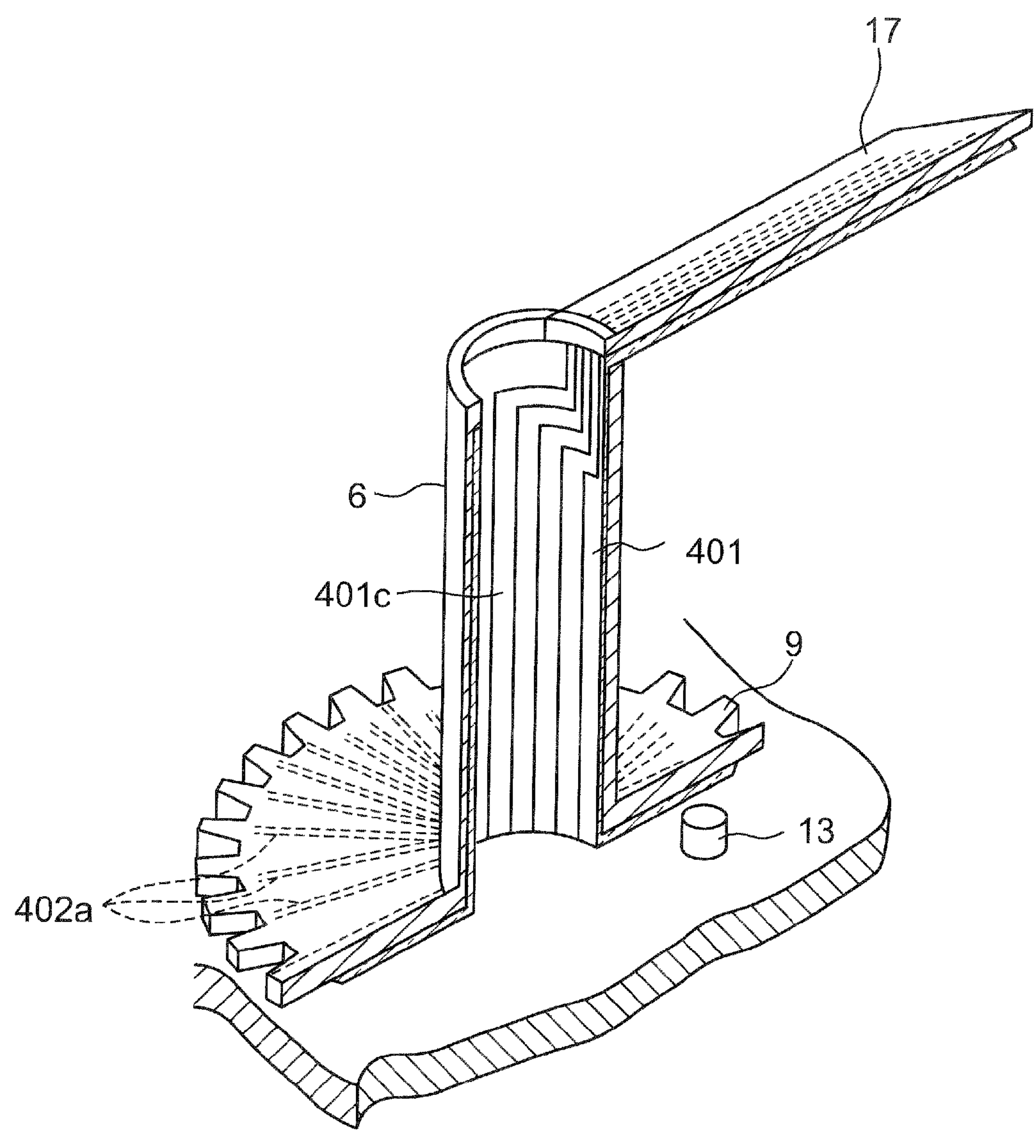
FIG. 12 is a cross sectional view showing a center wheel of the hand type watch shown in FIG. 11 viewed from diagonally above.

However, in the fourth embodiment, as shown in FIG. 12, the entrance 402*a* of the optical guiding sheet 401 corresponding to the optical guiding sheet 206 branches for each optical waveguide on the lower surface of the center wheel 9 in a shape extending radially from the center of the center wheel spindle.

Accordingly, the light emitting diode 13 which is the light source is provided below a portion where the large number of entrances 402*a* extending radially to the tip of the optical guiding sheet 401 passes due to the rotation of the center wheel 9.

According to the hand type watch 400 as configured above, the light of the light emitting diode 13 enters the optical guiding sheet 401 from one of the large number of entrances 402*a* which extend radially, the light is guided to the tip of the minute hand 1 through the optical guiding sheets 401 and 17, and the light exits from the tip.

With this, the tip portion of the minute hand 1 is illuminated. As a result, the numerals 5*b*, etc. provided on the dial plate 5 are illuminated.

In the hand type watch 400, if the number of optical waveguides is small, the tip repeats flashing due to the rotation of the center wheel 9. However, when the number of optical waveguides is large, for example, about 120, the light of at least two adjacent entrances 402*a* of the optical waveguides can receive light simultaneously, and with this the above problem is solved.

According to the hand type watch 400 of the fourth embodiment, the degree of freedom of where to provide the light emitting diode 13 which is the light source increases.

The optical guiding sheets 401 and 17 of the fourth embodiment can be integrated as in the third embodiment.

Fifth Embodiment

Figure 13:
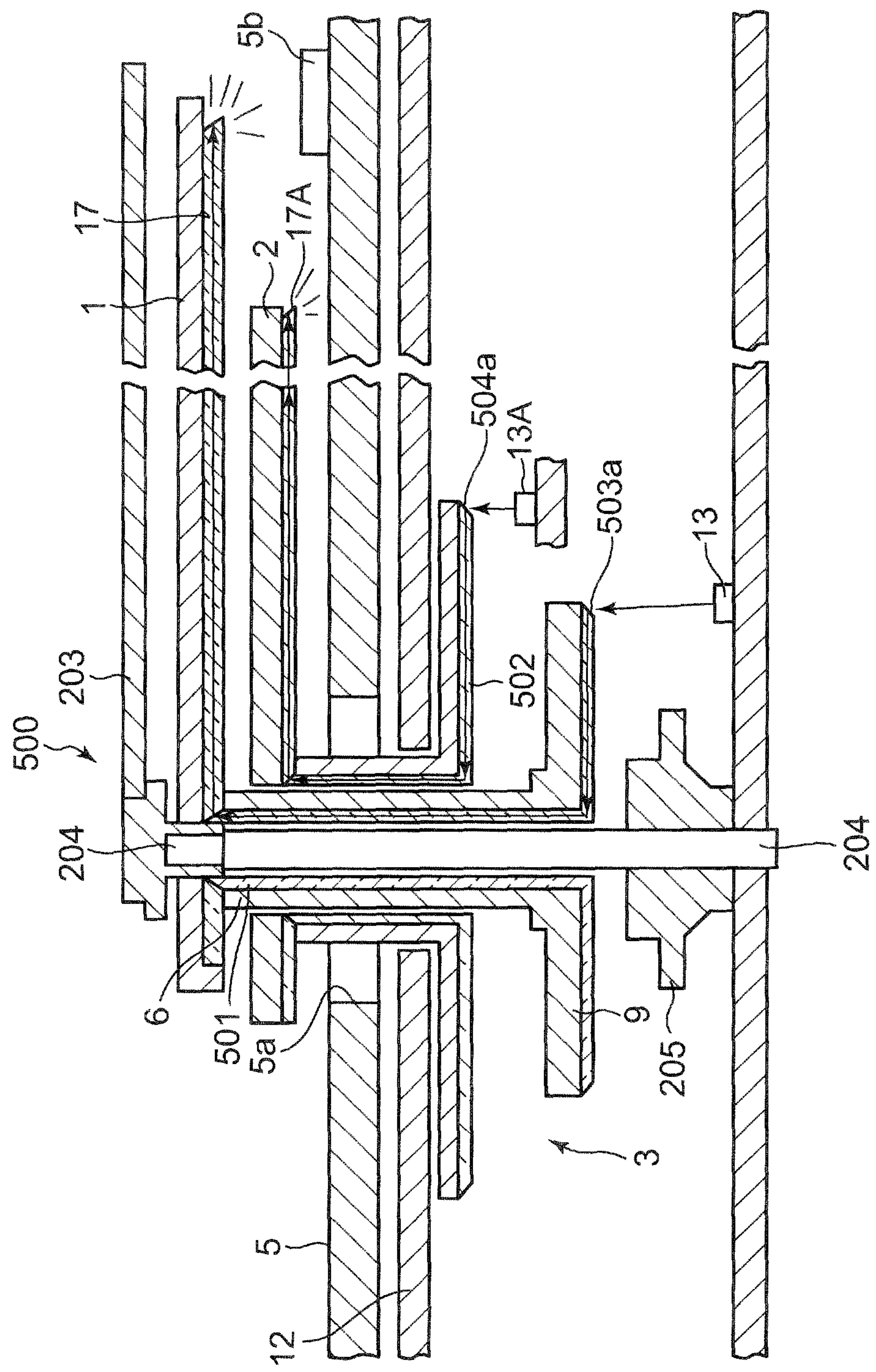
FIG. 13 is a cross sectional view showing a main section of a hand type watch of a fifth embodiment of the present invention.

FIG. 13 shows a fifth embodiment of the hand type watch of the present invention.

In the drawings, the same reference numerals are applied to the members which are the same as those of the above embodiments.

In the fifth embodiment, the configuration of the fourth embodiment is applied to two hands, and an optical guiding sheet 501 is provided inside the minute hand spindle 6 and an optical guiding sheet 502 is provided inside the hour hand spindle 7.

Corresponding to the above, another light emitting diode 13A which is the light source is provided and an optical guiding sheet 17A is attached to the hour hand Here, the configuration of the optical guiding sheets 501 and 502 is substantially the same as that of the optical guiding sheet 401 and the configuration of the optical guiding sheet 17A is substantially the same as that of the optical guiding sheet 17.

According to the hand type watch 500 as configured above, the light of the light emitting diode 13 enters the optical guiding sheet 501 from the entrances 503*a*, the light is guided to the tip of the minute hand 1 through the optical guiding sheets 501 and 17, and the light exits from the tip.

The light of the light emitting diode 13A enters the optical guiding sheet 502 from the entrances 504*a*, the light is guided to the tip of the hour hand 2 through the optical guiding sheets 502 and 17A, and the light exits from the tip.

With this, the tip portions of the minute hand 1 and the hour hand 2 are illuminated.

As a result, the numerals 5*b*, etc. provided on the dial plate 5 are illuminated.

According to the hand type watch 500 of the fifth embodiment, each of the tip portion of the minute hand 1 and the hour hand 2 is illuminated, and with this the numerals 5*b*, etc. are illuminated. Therefore, the time shown by the minute hand 1 and the hour hand 2 can be confirmed immediately even at night.

In the fifth embodiment, the optical guiding sheet 501 of the minute hand 1 side can be replaced to an optical guiding member such as an optical guide or rod lens similar to the first embodiment.

Various embodiments of the present invention are described above, however, the present invention is not limited to the above embodiments and various modifications are possible.

For example, the optical guiding sheet where the optical waveguide is one layer is described, however, an optical guiding sheet with a plurality of layers can be used.

In this case, inclining direction of the reflecting surface of the exit for each layer can be changed to illuminate not only the numerals 5*a*, etc. but also the extending direction of the hand, the hand itself, etc.

The position of the exit can be changed to illuminate not only the tip of the hand but also the midway portion of the hand or the base portion of the hand.

In this case, in order to illuminate the hand itself, the portion where it is desired to be illuminated can be formed from a translucent member.

In the above embodiment, the plurality of optical waveguides of the optical guiding sheet 301 are provided inside the hand spindle, however the above can be provided inside or outside the hand spindle.

The plurality of optical waveguides of the optical guiding sheet 301 which is an integrated optical guiding member can be formed inside or outside the hand spindle or on the upper surface or the lower surface of the hand.

The embodiments describe applying the present invention to a hand type watch, however, the present invention can be widely applied to a table clock, a wall clock or hand type measuring devices of a car.

The entire disclosure of Japanese Patent Application No. 2011-216627 filed on Sep. 30, 2011 including specification, claims, drawings and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A hand illuminating apparatus comprising:

a hand which is driven to rotate by a hand spindle;

a light source provided in a position below the hand spindle;

a first optical guiding section which is provided to guide light from the light source from a lower edge to an upper edge of the hand spindle; and a second optical guiding section in which a plurality of optical waveguides are formed on the hand, and which is provided to guide light which exits from the first optical guiding section from a base to a tip of the hand.

2. The hand illuminating apparatus according to claim 1, wherein the first optical guiding section includes an optical guiding sheet attached to an inner circumferential surface of the hand spindle and the light source is provided in a position below the optical guiding sheet.

3. The hand illuminating apparatus according to claim 1, wherein the first optical guiding section includes a column shaped optical guiding block provided in a center of the hand spindle and the light source is provided in a position below the optical guiding block.

4. A hand illuminating apparatus comprising:

a hand which is driven to rotate by a hand spindle;

a light source provided in a position below the hand spindle; and an integrated optical guiding section in which a plurality of optical waveguides are formed on the hand spindle and the hand, and which guides light from the light source from a lower edge to an upper edge of the hand spindle and from a base to a tip of the hand.

5. The hand illuminating apparatus according to claim 4, wherein the plurality of optical waveguides of the integrated optical guiding section are formed on an inside or outside of the hand spindle, and an upper surface or a lower surface of the hand.

* * * * *